(12) United States Patent
Van Blokland

(10) Patent No.: US 11,832,619 B2
(45) Date of Patent: Dec. 5, 2023

(54) DOUGH PROCESSING DEVICE, FOR USE ON A DOUGH LINE

(71) Applicant: Radie B.V., BC Culemborg (NL)

(72) Inventor: Johannes Josephus Antonius Van Blokland, BG Laren (NL)

(73) Assignee: Radie B.V., Culemborg (NL)

( * ) Notice: Subject to any disclaimer, the term of this patent is extended or adjusted under 35 U.S.C. 154(b) by 1044 days.

(21) Appl. No.: 16/229,523

(22) Filed: Dec. 21, 2018

(65) Prior Publication Data

US 2019/0191719 A1    Jun. 27, 2019

(30) Foreign Application Priority Data

Dec. 22, 2017 (EP) .................................... 17210223

(51) Int. Cl.
*A21C 9/08* (2006.01)
*A21C 11/00* (2006.01)
*A21C 11/10* (2006.01)

(52) U.S. Cl.
CPC ............... *A21C 9/08* (2013.01); *A21C 9/088* (2013.01); *A21C 11/00* (2013.01); *A21C 11/10* (2013.01)

(58) Field of Classification Search
CPC .......... A21C 9/08; A21C 9/088; A21C 11/00; A21C 11/10; B65G 47/12; B65G 21/2072; B27B 5/34; B27B 7/04; Y10T 83/7876; Y10T 83/4833; Y10T 83/7747; Y10T 83/7859

(Continued)

(56) References Cited

U.S. PATENT DOCUMENTS

| 1,543,136 | A | * | 6/1925 | Ward | A21C 5/00 83/135 |
| 1,668,819 | A | * | 5/1928 | Parsons | A21C 5/00 83/902 |

(Continued)

FOREIGN PATENT DOCUMENTS

| CN | 2019228885 U | 8/2011 |
| DE | 19540486 A1 | 4/1997 |

(Continued)

OTHER PUBLICATIONS

Extended European seach report dated Jul. 4, 2018, from European Patent Application No. EP 17210223.8, 8 sheets.

(Continued)

*Primary Examiner* — Charles Capozzi
(74) *Attorney, Agent, or Firm* — Welsh IP Law LLC

(57) ABSTRACT

The present invention relates to a dough processing device, for use on a dough line, comprising at least one dough processing tool, such as a flour dispenser, a roller, a cutter, a folding shoe, for processing the dough on a conveyor; arranged in a frame, arranged for being placed as a bridge over a dough conveyor and thereto having supports at opposite ends; provided with a fastener, for fastening the supports on either side to a dough conveyor housing; wherein at least one support is provided with a transport device, for transporting the dough processing device directly over a conveyor while supporting the dough processing device on said conveyor. The invention further relates to a dough processing line comprising such a dough processing device.

12 Claims, 2 Drawing Sheets

(58) Field of Classification Search
USPC ............ 99/485; 118/13, 15; 198/443, 836.3; 83/344, 507, 508.3, 481
See application file for complete search history.

(56) References Cited

U.S. PATENT DOCUMENTS

| | | | |
|---|---|---|---|
| 4,095,926 | A | 6/1978 | Paul |
| 4,582,472 | A | 4/1986 | Handson |
| 4,938,126 | A * | 7/1990 | Rubio ................. A21C 11/006 100/151 |
| 7,837,540 | B2 | 11/2010 | van den Nieuwelaar |
| 2006/0246190 | A1* | 11/2006 | Belzowski ............... A21C 9/04 426/289 |
| 2014/0134314 | A1 | 5/2014 | Emerson et al. |
| 2018/0352819 | A1 | 12/2018 | Maier et al. |

FOREIGN PATENT DOCUMENTS

| | | |
|---|---|---|
| DE | 102006046506 A1 | 4/2008 |
| DE | 202008000083 U1 | 8/2009 |
| DE | 102013218071 A1 | 5/2014 |
| EP | 1132003 A1 | 9/2001 |
| EP | 1334054 A1 | 8/2003 |
| EP | 1226756 A1 | 7/2007 |
| EP | 1902621 A2 | 3/2008 |
| EP | 3081090 A1 | 10/2016 |
| WO | 02/24555 A1 | 3/2002 |
| WO | 2017091842 A1 | 6/2017 |

OTHER PUBLICATIONS

Communication of Notice of Opposition provided Jul. 31, 2023 in related EP3501286B1, includes opposition (forty pages).
Document D7 Cited in Opposition to related EP3501286B1 identified by Opposer as evidence of prior public use.

* cited by examiner

DOUGH PROCESSING DEVICE, FOR USE ON A DOUGH LINE

TECHNICAL FIELD

The present invention relates to a dough processing device, for use on a dough line. More in particular, the invention relates to a device that is configured for being temporarily removed from its position along a conveyor. The present invention further relates to a dough line comprising at least one of such removable dough processing devices.

BACKGROUND

Removal may be required when the dough line is rearranged for manufacturing another product for which the dough processing device is not necessary or needs to be replaced with another device, for cleaning purposes, for maintenance, or in cases where the dough processing device is required at a different location along the conveyor.

From EP1334054 it is known to apply modular sections in a dough processing line, wherein the sections can be moved over a support such as a floor, and the actual dough processing device is hanging above the conveyor, or encloses it in a U-shaped manner. Such configuration has the disadvantage that the processing device is voluminous and heavy.

Alternatively, dough processing devices may be arranged as a bridge over a dough conveyor. Along the conveyor, multiple processing devices may be arranged. The processing devices may form one integral device with a part of the conveyor, but in more flexible and modular configurations, the dough processing device is a separate unit, that can be mounted onto the conveyor at any desired location.

In most cases, the processing devices have such weight and/or dimensions, that they cannot easily be removed by a single person, in particular not when no lifting or hoist device is available. Apart from the difficulties the person may have, there is also a risk of damaging the surrounding equipment, in particular the conveyor the dough processing device is mounted to.

SUMMARY

It is a goal of the present invention to provide a solution for the above disadvantages of the prior art.

The invention thereto proposes a dough processing device, for use on a dough line, comprising: dough processing means, such as a flour dispenser, a roller, a cutter, a folding shoe, and combinations of these tools, for processing the dough on a conveyor; arranged in a frame, arranged for being placed as a bridge over a dough conveyor and thereto having supports at opposite ends thereof; wherein at least one of the frame ends is provided with transport means, for transporting the dough processing device directly over a conveyor while supporting the dough processing device on said conveyor.

Configurations wherein the dough processing device is mounted directly onto the conveyor are more compact and easier to handle and store than those according to—for instance—EP1334054. An additional advantage of the bridge configuration is that it can be removed from the conveyor towards either side of it, that is, crossing the conveyor in both directions, which is for instance not possible with the U-shaped enclosing.

BRIEF DESCRIPTION OF THE DRAWINGS

Herein.

DETAILED DESCRIPTION

Figure 1:
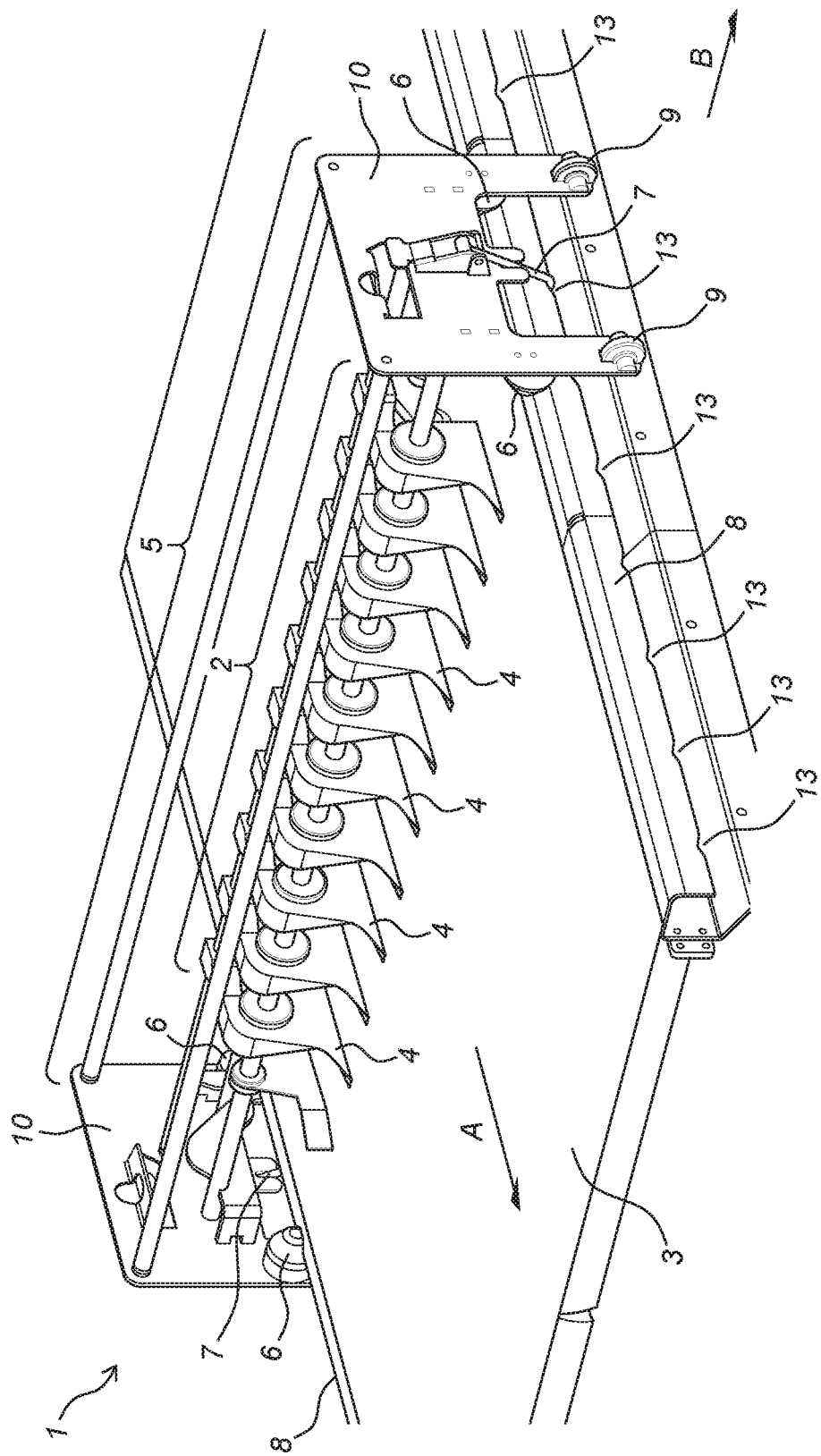
FIG. 1 shows a general overview of the present invention.

The dough processing means may for instance be a flour, water or butter dispenser, a roller, a cutter, a folding shoe or any other dough processing equipment that can be arranged in a bridge-like configuration mounted on a conveyor housing. In its mounted position, the supports commonly support the dough processing device onto an upper surface of the conveyor housing. For this purpose, the supports are provided with vertical support surfaces arranged for contacting the upper surface of the conveyor housing thereby supporting the dough processing device in a vertical direction. The supports may moreover by configured to contact the sides of the conveyor housing in a mounted position of the dough processing device to ensure that the dough processing device and therefore the dough processing means are properly aligned with the conveyor in a direction perpendicular to the direction of conveyance. For this purpose, the supports are provided with horizontal support surfaces arranged for contacting the sides of the conveyor housing thereby supporting the dough processing device in a horizontal direction.

Since the direction of removal of the device is crossing the conveyor, the transport means are oriented for transport in a direction perpendicular to a transport direction of a conveyor, or, related to the dough processing device itself, a direction from support to support or (in general) the length direction of the dough processing device.

The transport means may be any means that are suitable for transporting the dough processing device over the conveyor, being directly supported thereby, in such way that the conveyor is not damaged. Sliding or rolling solutions are possible, and in an embodiment, the transport means are wheels. In general, the transport means may comprise a plastics material and more in particular a food grade material, such as Polyoxymethylene (POM). The frame itself may be made from stainless steel or any other food grade material too.

The frame may at the opposite ends provided with head end plates or headboards. The transport means are is this case preferably connected to at least one of the head end plates, and possibly both head end plates, extending downwardly below the dough processing means, or being oriented at least such that the dough processing device can easily be suspended on the conveyor.

When not in use, the wheels should extend as little as possible outside the contour of the dough processing device, in order to avoid any impediment of personnel or adjacent devices. For similar reasons, the wheels themselves are preferably small and having a diameter between 30 and 70 mm. To minimize the lifting effort for putting the dough processing device on the conveyor, the support-engaging-surface of the transport means may normally (that is: in a normal operation position of the dough processing device) be arranged between 5 and 200 mm below conveyor surface level, which level commonly corresponds to the level of the vertical support surfaces of the supports that rest on the upper surface of the conveyor in a mounted position of the dough processing device.

In order to allow the transport means to be smoothly guided along the side of the dough conveyor housing when lifting the dough processing device from a mounted position onto the upper surface of the dough conveyor, the surfaces of the transport means facing the conveyor may at their innermost end be outlined with a horizontal support surface of one of the supports. This horizontal support surface coincides with a side of a dough conveyor housing in a mounted position of the dough processing device.

Moreover, the transport means may extend downwardly past the vertical support surfaces of the supports (and thus past the dough conveying surface in a mounted position of the dough processing device) over a length less than the length over which the horizontal support surfaces of the supports are configured to contact the sides of the conveyor housing. As a result of this limitation it is ensured that either the supports or the transport means are in contact with the side of the conveyor housing in the process of lifting the dough processing device onto the conveyor surface. Consequently, the dough processing device is not able to unexpectedly shift with respect to the conveyor in a direction perpendicular to the direction of conveyance or to get stuck behind the conveyor housing during lifting.

In a possible embodiment of the dough processing device according to the invention, the frame may be provided with fastening means, for fastening the supports on either side to a dough conveyor housing. Especially when the dough processing device is arrange to contact the dough during processing, the fastening means ensure that the dough processing device is retained at a fixed position with relation to the conveyor. The fastening means may comprise hook-shaped elements that grab around part of the dough conveyor housing. The conveyor housing may for this purpose be provided with notches along its length the form predetermined gripping points for engagement by the fastening means.

The invention further relates to a dough line for processing dough comprising: a dough conveyor, comprising a dough conveying surface delimited on either side along a direction of conveyance by a conveyor housing comprising upper and side surfaces; and at least one dough processing device according to any of the preceding claims, mountable on the dough conveyor, wherein in a mounted position the vertical and horizontal support surfaces of the supports are supported by the upper and side surfaces of the conveyor housing respectively.

In a possible embodiment of the dough line according to the invention, at least one of the side surfaces of the conveyor housing is slanted in a downward and outward direction relative to the conveyor, thereby enclosing an angle with the vertical. The slanted side surface function to guide the transport means along the side of the conveyor housing toward the upper surface of the conveyor. With an increase in the angle over which the side surface is slanted, the effort required for lifting the dough processing device onto the conveyor upper surface will decrease, making it possible for a single person to lift and transport the dough processing device for removal from the dough line or placement at a different location along the dough line.

The invention will now be elucidated into more detail with reference to the following figures.

FIG. 1 shows a general overview of the present invention. The figure shows a dough processing device 1, for use on a dough line, comprising dough processing means 2 formed by a number of folding shoes 4, for processing the dough on a conveyor 3; arranged in a frame 5 placed as a bridge over the dough conveyor 3 and thereto having supports 6 at opposite ends. The supports 6 are provided with vertical and horizontal support surfaces 14, 15 arranged for respectively contacting an upper surface 16 and sides 17 of a conveyor housing thereby supporting the dough processing device 1 in a horizontal and vertical direction. The supports 6 are mounted on but may as well be part of head end plates 10 of the frame, which are provided with fastening means 7, for fastening the head end plates 10 and supports 6 on either side to a dough conveyor housing 8. For this purpose, the conveyor housing 8 is provided with notches 13 along its length for forming predetermined gripping points for engagement by the fastening means 7. One head end plate 10 is provided with transport means 9, for transporting the dough processing device 1 over the conveyor 3 while supporting the dough processing device 1 on said conveyor 3. It is additionally possible that the transport means 9 are provided on both head end plates 10, allowing the removal of the dough processing device 1 via both sides of the conveyor 3.

Figure 2:
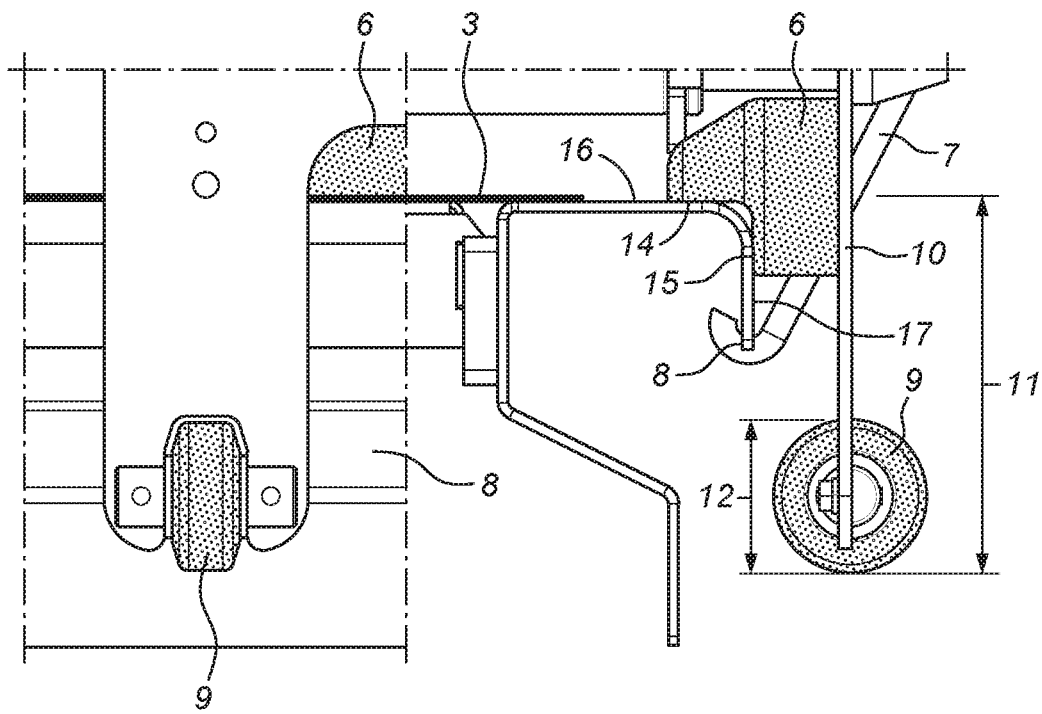
FIG. 2 shows a front- and a side view of a detail of the present invention.

FIG. 2 shows a front- and a side view of a detail of the present invention. Visible is a support 6 connected to a head end plate 10 of the frame, which head end plate 10 is coupled to a conveyor housing 8 by means of a fastener 7. The frame may for instance be formed of stainless steel, and the transport means are formed by wheels 9, arranged at the head ends 6 of the frame 5, extending downwardly. The wheels have a diameter 12 between 30 and 70 mm and their lowest point may be at a distance 11 between 5 and 200 mm from the level of the conveyor. The transport means may also be referred to as a transport device. In one embodiment, the transport means comprises at least one wheel.

Figure 3:
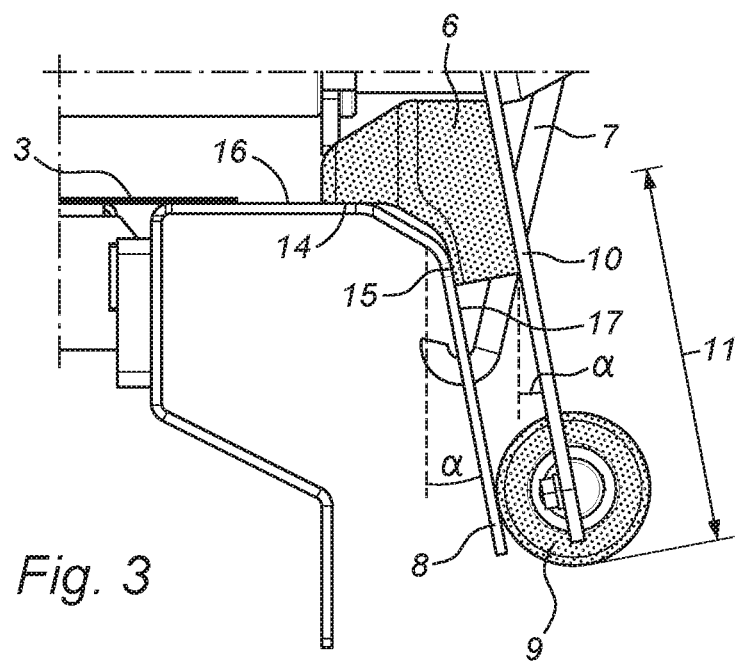
FIG. 3 shows a side view on a detail of an alternative embodiment of the present invention.

FIG. 3 shows side view on a detail of an alternative embodiment of the present invention, showing the same elements of the invention as shown in FIG. 2. This time however, the side 17 of the conveyor housing 8 is slanted in a downward and outward direction relative to the dough conveyor 3, thereby enclosing an angle α with the vertical. As the surface of the transport means 9 facing the conveyor housing 8 is at its innermost end outlined with a horizontal support surface 15 of one of the supports, and as this horizontal support surface 15 coincides with the side 17 of the conveyor housing 8 in a mounted position of the dough processing device 1, the head end plate 10 consequently encloses an angle α with the vertical as well. Another difference with the detail shown in FIG. 2 is that the conveyor housing 8 extends past the transport means 9, as a result of which the innermost end of the surface of the transport means 9 facing the conveyor housing 8 lies against the conveyor housing 8. This downward extension of the conveyor housing 8 past the transport means 9 guarantees proper guidance of the transport means 9 along the conveyor housing 8, facilitating lifting the dough processing device onto the conveyor 3.

The wheels in the examples above are oriented such that the dough processing device 1 can be removed in a direction B, which is the length direction of the frame and perpendicular to the direction of conveyance A of the conveyor.

The above examples are exemplary only and in no sense limiting the scope of the invention, as defined in the following claims.

The invention claimed is:

1. A dough line for processing dough comprising:
   a dough conveyor, comprising a dough conveying surface delimited on either side along a direction of conveyance by a conveyor housing comprising upper and side surfaces; and a dough processing tool, which includes one or more selected from a group consisting of a flour dispenser, water dispenser, butter dispenser, a roller, a cutter, and a folding shoe, for processing a dough on the dough conveyor;

a frame, in which the dough processing tool is arranged, comprising supports at opposite frame ends thereof, wherein the frame is configured to be received on the conveyor and selectively fixed relative thereto, wherein the frame is configured to define a bridge over the conveyor when the frame is received thereon and fixed thereto; and a transport device coupled to at least one of the frame ends, wherein the transport device is configured to transport the dough processing tool and the frame between a first position and a second position, wherein in the first position the frame is fixed relative to the conveyor so that the dough processing tool is directly over the dough conveyor, wherein in the second position the dough processing tool and the frame are physically separated from the conveyor and moveable relative thereto such that the dough processing tool and the frame can be moved to and used on a separate dough line;

wherein the transport device is configured to transport the dough processing tool and the frame in a direction perpendicular to a transport direction of the dough conveyor, and wherein in the first position the upper and side surfaces of the conveyor housing respectively support vertical and horizontal support surfaces of the supports.

2. The dough processing line according to claim 1, wherein the transport device comprises at least one wheel.

3. The dough processing line according to claim 2, wherein the at least one wheel has a diameter between 30 and 70 mm.

4. The dough processing line according to claim 2, wherein a lowest point of the at least one wheel is at a distance between 5 and 200 mm from the level of a vertical support surface of the supports.

5. The dough processing line according to claim 1, wherein the transport device is made of a plastics material.

6. The dough processing line according to claim 1, wherein the dough processing tool is made of a food grade material.

7. The dough processing line according to claim 1, wherein the frame is at the opposite frame ends provided with head end plates, wherein the transport device is connected to at least one of the head end places extending downwardly below the dough processing tool.

8. The dough processing line according to claim 1, wherein the supports are provided with the vertical and horizontal support surfaces arranged for respectively connecting with the upper and side surfaces of the conveyor housing thereby supporting the dough processing tool in a horizonal and vertical direction.

9. The dough processing line according to claim 8, wherein an innermost end surface of the transport device facing the conveyor is aligned with the vertical support surface of one of the supports.

10. The dough processing line according to claim 1, wherein the frame comprises stainless steel.

11. The dough processing line according to claim 1, wherein the dough processing tool comprises at least one fastener for fixing the dough processing tool and the frame relative to the conveyor when the in the first position.

12. The dough processing line according to claim 1 wherein at least one of the side surfaces of the conveyor housing is slanted in a downward and outward direction relative to the dough conveying surface.

* * * * *